(12) United States Patent
Geisel

(10) Patent No.: US 9,801,363 B2
(45) Date of Patent: Oct. 31, 2017

(54) FLY REEL WITH DETACHABLE DRAG ASSEMBLY

(71) Applicant: ALLEN FLY FISHING, Southlake, TX (US)

(72) Inventor: Justin Allen Geisel, Haslett, MI (US)

(73) Assignee: Allen Fly Fishing LLC, Southlake, TX (US)

( * ) Notice: Subject to any disclaimer, the term of this patent is extended or adjusted under 35 U.S.C. 154(b) by 525 days.

(21) Appl. No.: 14/466,267

(22) Filed: Aug. 22, 2014

(65) Prior Publication Data

US 2015/0053807 A1    Feb. 26, 2015

Related U.S. Application Data

(60) Provisional application No. 61/869,246, filed on Aug. 23, 2013.

(51) Int. Cl.
*A01K 89/01* (2006.01)
*A01K 89/033* (2006.01)
*A01K 89/016* (2006.01)

(52) U.S. Cl.
CPC .......... *A01K 89/033* (2013.01); *A01K 89/016* (2013.01); *Y10T 29/49817* (2015.01)

(58) Field of Classification Search
CPC .. A01K 89/016; A01K 89/045; A01K 89/058; A01K 89/059
See application file for complete search history.

(56) References Cited

U.S. PATENT DOCUMENTS

| | | |
|---|---|---|
| 2,130,671 A | 9/1938 | Maynes |
| 2,344,209 A | 3/1944 | Lowe |
| 2,459,963 A | 1/1949 | Roark |
| 2,561,935 A | 7/1951 | McCash |
| 2,714,271 A | 8/1955 | Stratton |
| 3,432,114 A | 3/1969 | Meisner |
| 3,476,322 A | 11/1969 | Sutz |
| 3,697,012 A | 10/1972 | Walker |
| 3,741,493 A | 6/1973 | Jones |
| 3,989,204 A | 11/1976 | Lemery |
| 4,278,217 A | 7/1981 | Blackwell |
| 4,352,474 A | 10/1982 | Kovalovsky |
| 4,708,303 A | 11/1987 | Emura et al. |
| 4,728,054 A | 3/1988 | Pisapio |
| 4,779,819 A | 10/1988 | Emura et al. |
| 4,796,828 A * | 1/1989 | Councilman ........ A01K 89/027 242/245 |
| 4,815,676 A | 3/1989 | Young |
| 4,832,278 A | 5/1989 | Sugeta |
| 4,881,698 A | 11/1989 | Doiron |
| 4,958,785 A | 9/1990 | Aoki |
| 5,176,336 A * | 1/1993 | Kaneko ................. A01K 89/02 242/264 |
| 5,199,682 A | 4/1993 | James |

(Continued)

FOREIGN PATENT DOCUMENTS

CA    2472461 A1 *  7/2003  .......... A01K 89/016

*Primary Examiner* — Emmanuel M Marcelo
(74) *Attorney, Agent, or Firm* — Vedder Price P.C.

(57) ABSTRACT

A fishing reel includes a frame, a drag assembly and a spool. The drag assembly connects the spool to the frame and includes a base, a brake housing and a nose connected together and sealed as a single unit that can be removed and replaced from the reel.

5 Claims, 7 Drawing Sheets

(56) References Cited

U.S. PATENT DOCUMENTS

| | | | |
|---|---|---|---|
| 5,299,757 A | | 4/1994 | Sugawara |
| 5,556,049 A | * | 9/1996 | Bennett ................ A01K 89/016 |
| | | | 242/295 |
| 5,590,847 A | | 1/1997 | Ament |
| 5,609,309 A | | 3/1997 | Oh |
| 6,073,870 A | | 6/2000 | Shinohara et al. |
| 6,164,576 A | | 12/2000 | Takahashi |
| 6,286,772 B1 | * | 9/2001 | Koelewyn ............... A01K 89/02 |
| | | | 242/246 |
| 6,513,743 B1 | | 2/2003 | Perkins, Jr. et al. |
| 6,964,389 B2 | | 11/2005 | Hill et al. |
| 7,163,167 B2 | | 1/2007 | Ikuta et al. |
| 8,353,638 B2 | | 1/2013 | Arnott |
| 8,368,271 B2 | | 2/2013 | Wiggins |
| 2002/0020772 A1 | | 2/2002 | Norris |
| 2003/0150947 A1 | | 8/2003 | Hong |
| 2013/0134810 A1 | | 5/2013 | Gray |
| 2013/0192915 A1 | | 8/2013 | Versteyhe et al. |
| 2013/0193788 A1 | | 8/2013 | Arihara et al. |
| 2013/0199314 A1 | | 8/2013 | Habibvand et al. |
| 2013/0228040 A1 | | 9/2013 | Anderson |
| 2013/0238213 A1 | | 9/2013 | Jensen |
| 2013/0239743 A1 | | 9/2013 | Liu et al. |
| 2013/0244537 A1 | | 9/2013 | Lennon |
| 2013/0255437 A1 | | 10/2013 | Hull et al. |
| 2013/0255618 A1 | | 10/2013 | Hwang et al. |
| 2013/0264914 A1 | | 10/2013 | Kalev |
| 2014/0151484 A1 | * | 6/2014 | Header ................ A01K 89/033 |
| | | | 242/295 |

\* cited by examiner

_US 9,801,363 B2_

1

FLY REEL WITH DETACHABLE DRAG ASSEMBLY

RELATED APPLICATIONS

This application is based on and claims priority to provisional U.S. Patent Application No. 61/869,246 filed Aug. 23, 2013, the contents of which are herein incorporated by reference.

BACKGROUND

Fishing reels, and in particular, fly fishing reels typically include drag systems that limit or restrict the rotational speed of a spool of the fishing reel. Drag systems are often used on fishing reels to vary the force required to pull fishing line off of a spool of a fishing reel as the line unwinds from the spool. The drag system also allows the user to rotate the spool in the opposite direction so that a user can retrieve the fishing line by winding the line back onto the spool.

One type of drag system includes many different components to achieve the desired operation of the fishing reel as previously described. Since fishing reels are often used in harsh environments that may include fresh water, salt water, dust, dirt and other contaminants, fishing reels and the included drag systems may fail or require maintenance. One drawback of traditional fishing reels and drag systems is that the entire reel, including the drag system, must be taken or delivered to a technician for repair. Another disadvantage is that a failed or damaged fishing reel cannot typically be repaired in the field. This disadvantage applies to failures in drag systems. The complexity of drag systems and their integration into fishing reels makes repairs in the field time-consuming and difficult.

An improved fishing reel is needed that solves the problems discussed above and provides a reliable, easily replaceable drag assembly. It is, therefore, an object of the present disclosure to provide an improved interchangeable drag assembly. Still another object of the present disclosure is to provide an improved drag assembly that allows for replacement of a drag assembly in the field. Still further it is an object of the present disclosure to provide an drag assembly that minimizes the time required to replace a drag assembly such that a user can continue to utilize the fishing reel when repair or maintenance is required.

BRIEF SUMMARY

One example drag assembly for use on a fishing reel includes a base, a brake housing connected to the base and a nose connected to the brake housing opposite the base. The base, brake housing and nose of the drag assembly are connected together as a single unit that can be secured and removed from the fishing reel with a locking mechanism.

In another example drag assembly, the brake housing further includes a cylindrical wall that defines a cavity in which drag assembly components are located.

In another example drag assembly, the cylindrical wall of the brake housing is configured to be received in a circular opening in a frame of a fishing reel and the drag assembly is secured to the frame of the fishing reel with an annular locking mechanism.

In another example drag assembly, the base of the drag assembly includes a threaded portion that interfaces with complimentary threads on the annular locking mechanism.

In still yet another example drag assembly, the brake housing is connected between the base and the nose. The nose includes a shaft with a central axis about which the nose rotates relative to the base and the brake housing.

In another example drag assembly, the nose further includes a cog and a frusto-conical transition portion, the transition portion having a first outer diameter substantially the same as an outer diameter of the brake housing at one end. The frusto-conical transition portion tapers to a second outer diameter smaller than the first outer diameter at the second end. The cog of the nose is located contiguous to the second end of the frusto-conical transition portion and is configured to receive a spool of the fishing reel.

A method of removing and replacing a drag assembly of a fishing reel is also disclosed. One example method includes disengaging a locking mechanism from a first drag assembly connected to a fishing reel. The method further includes removing the first drag assembly from the fishing reel. The first drag assembly including an adjustment knob, a base, a brake housing and a nose connected together as a single unit. The method also includes inserting a second drag assembly that is substantially similar to the first drag assembly through an opening in the fishing reel and engaging the locking mechanism to secure the second drag assembly to the fishing reel.

In another example method, a method of removing and replacing a drag assembly of a fishing reel may also include removing a spool from the nose of the first drag assembly and connecting to the spool to the second drag assembly.

BRIEF DESCRIPTION OF THE SEVERAL VIEWS OF THE DRAWINGS

Certain embodiments are shown in the drawings. However, it is understood that the present disclosure is not limited to the arrangements and instrumentality shown in the attached drawings, wherein.

DETAILED DESCRIPTION

Figure 1:
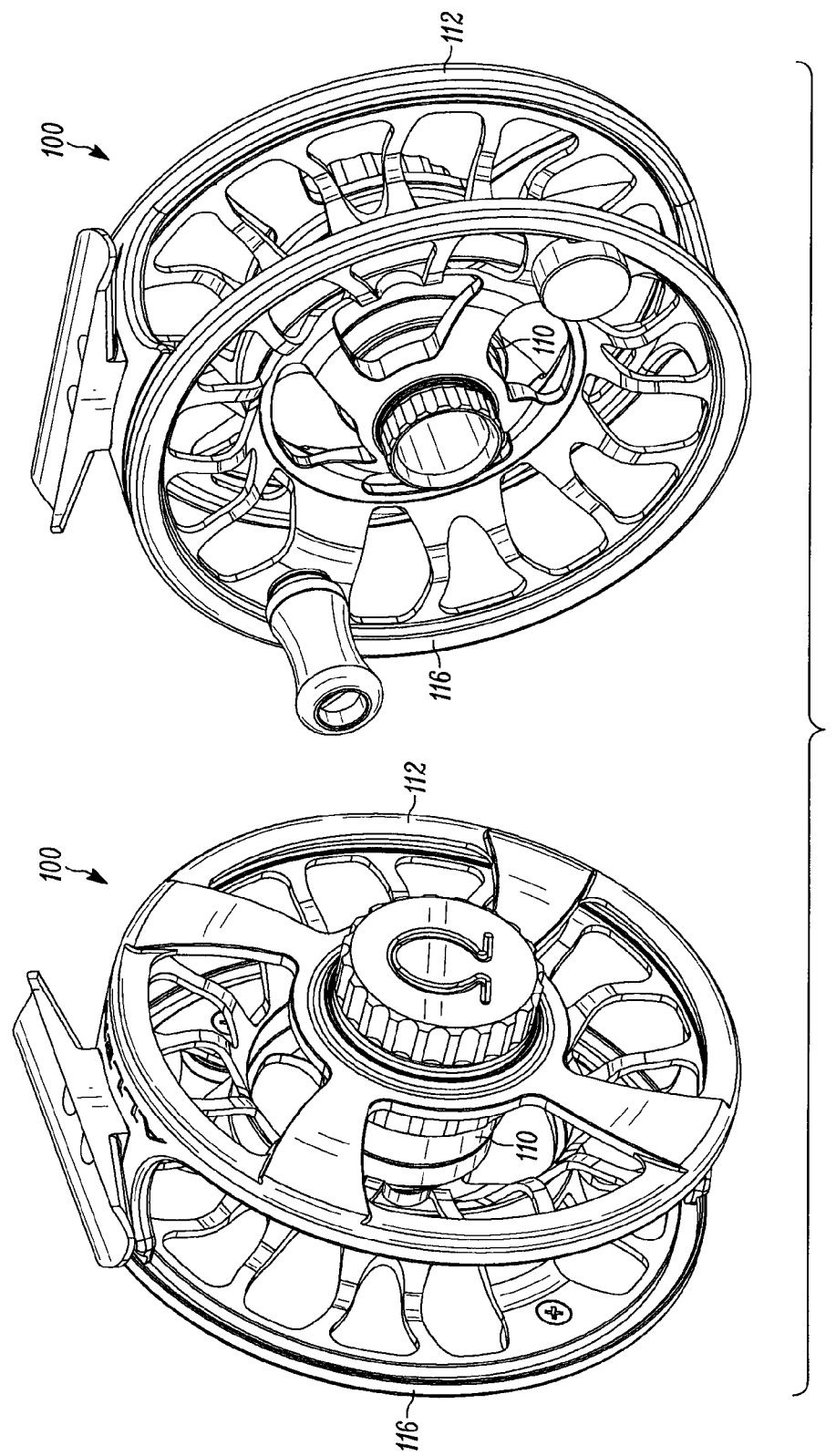
FIG. 1 is an illustration of one embodiment of a reel of the present disclosure.

For the purposes of promoting and understanding the principles disclosed herein, references are now made to the preferred embodiments illustrated in the drawings and specific language is used to describe the same. It is nevertheless understood that no limitation of the scope of the invention is thereby intended. Such alterations and further modifications in the illustrated device and such further applications of the principles disclosed as illustrated herein are contemplated as would normally occur to one skilled in the art to which this disclosure relates.

Figure 2:
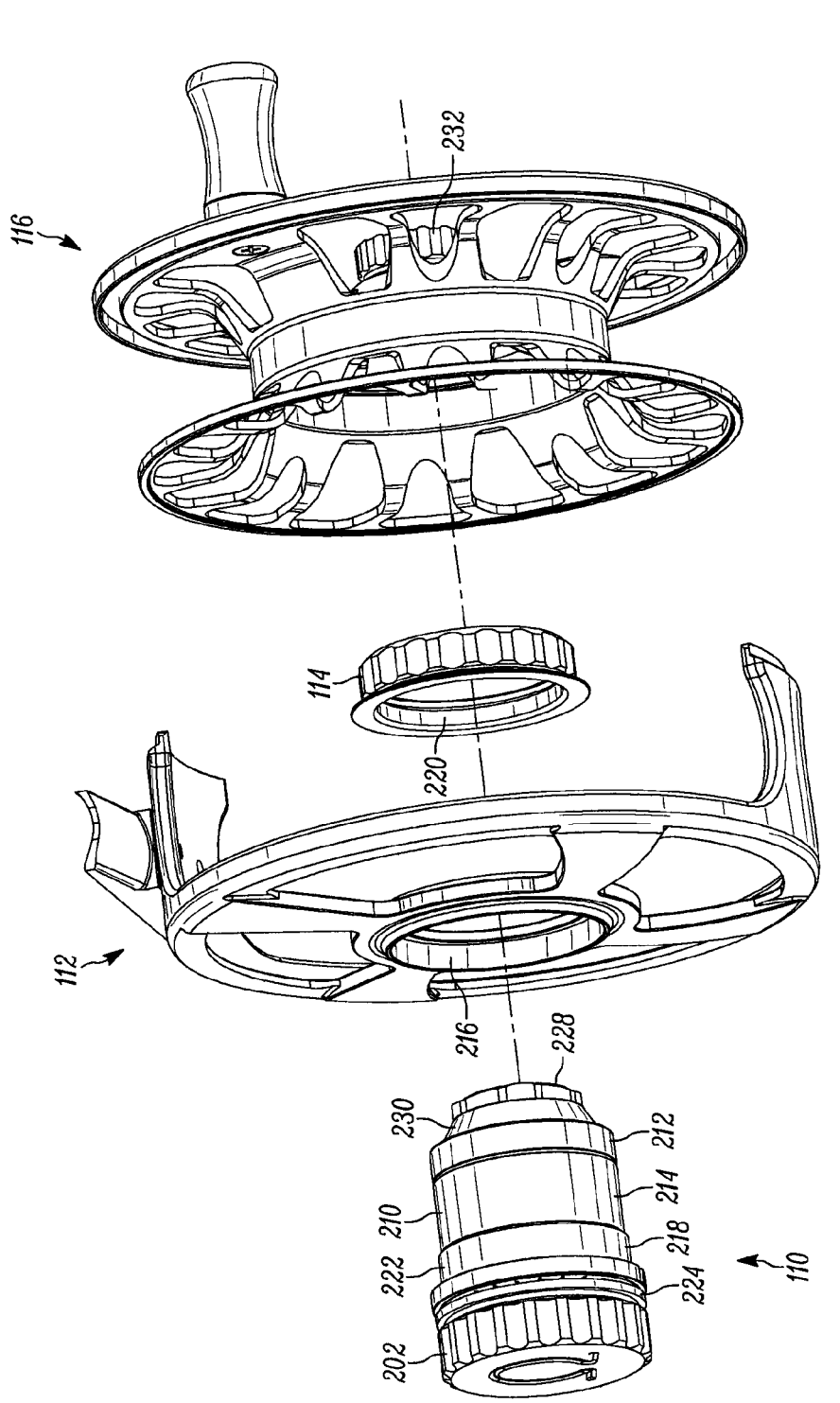
FIG. 2 is an exploded view of one embodiment of the present disclosure.
Figure 6:
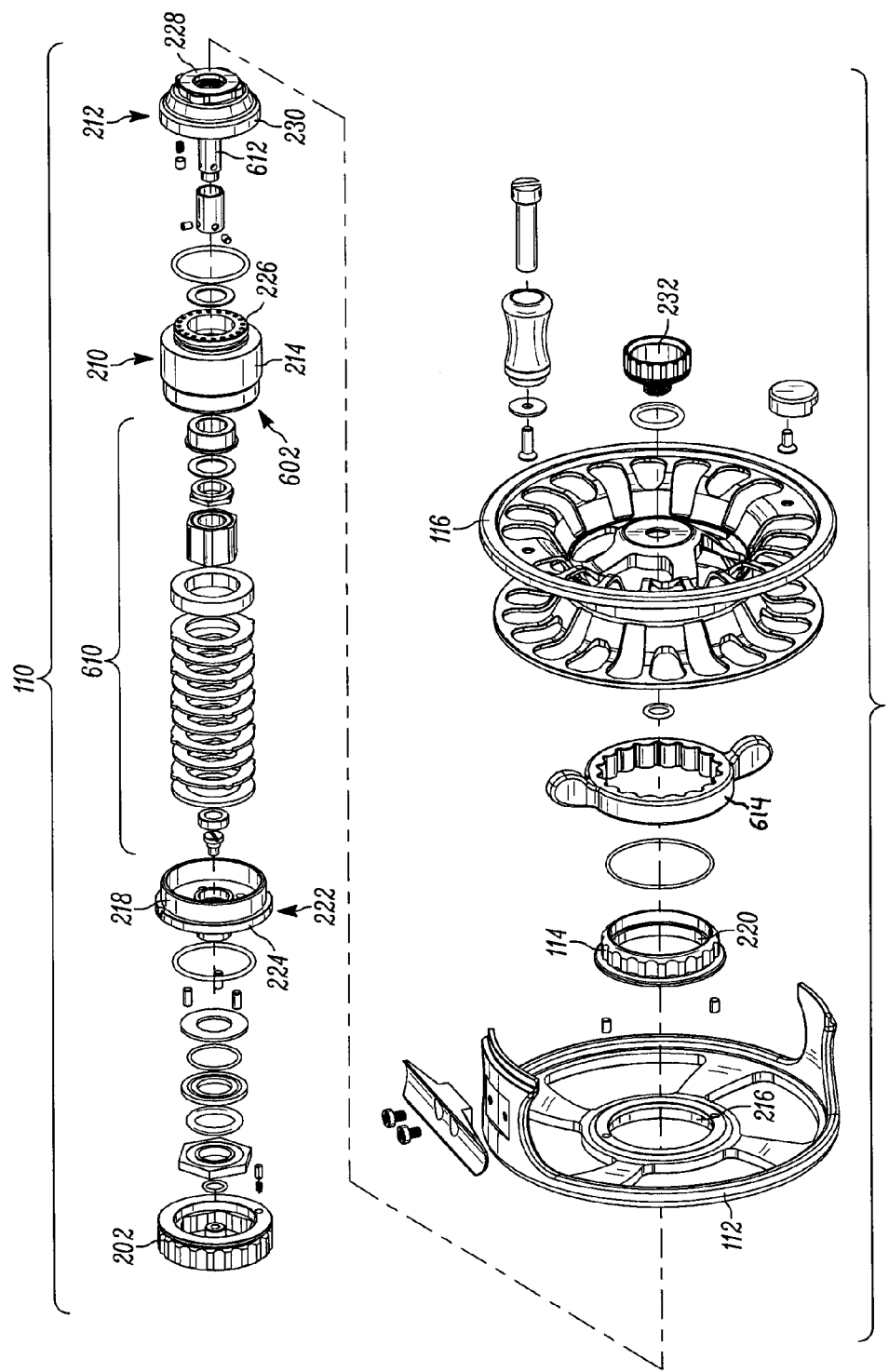
FIG. 6 is an exploded view of another embodiment of the present disclosure.
Figure 9:
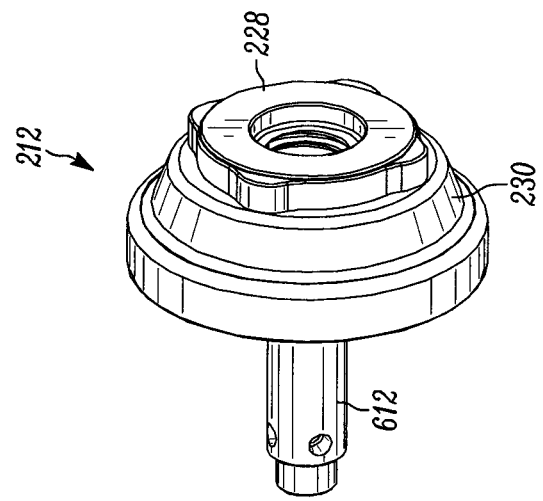
FIG. 9 is an illustration of a nose of one embodiment of the present disclosure.
Figure 8:
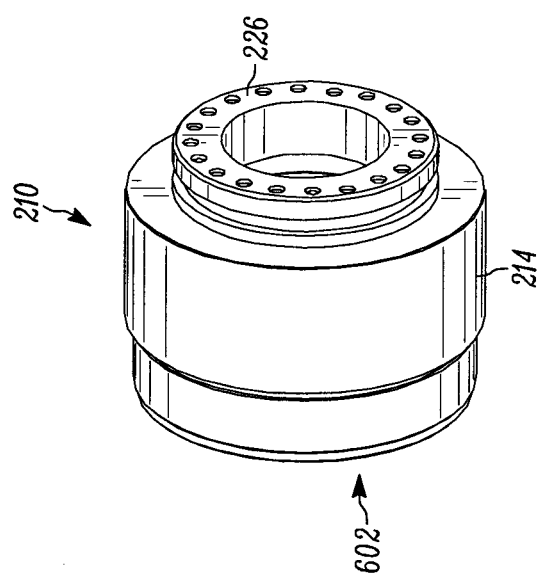
FIG. 8 is an illustration of a brake housing of one embodiment of the present disclosure.
Figure 7:
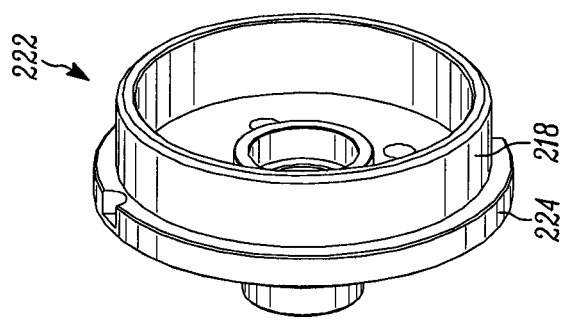
FIG. 7 is an illustration of a base of one embodiment of the present disclosure.

As shown in FIG. 1, a fishing reel 100 may include a drag assembly 110, a frame 112, a spool 116 and a locking mechanism 114. In one embodiment, as shown in FIG. 2, drag assembly 110 may include adjustment knob 202, base 222, brake housing 210 and nose 212. Drag assembly 110 is the element of fishing reel 100 to which spool 116 connects and permits spool 116 to spin for the purpose of releasing or retrieving fishing line. Drag assembly 110 also provides the functionality through which the force required to release fishing line can be varied by a user. In order to vary the force necessary to release fishing line, a user rotates adjustment knob 202. This action, in turn, interacts with the drag system 610 as shown in FIG. 6, to restrict rotation of nose 212. Adjustment knob 202 can be made of any suitable material. In one example, adjustment knob 202 is machined from aluminum and is connected to base 222 via a screw inserted through the bottom surface of base 222. The connection between base 222 and adjustment knob 202 may also include an o-ring or other sealing device that prevents the intrusion of contaminants into drag assembly 110.

Figure 3:
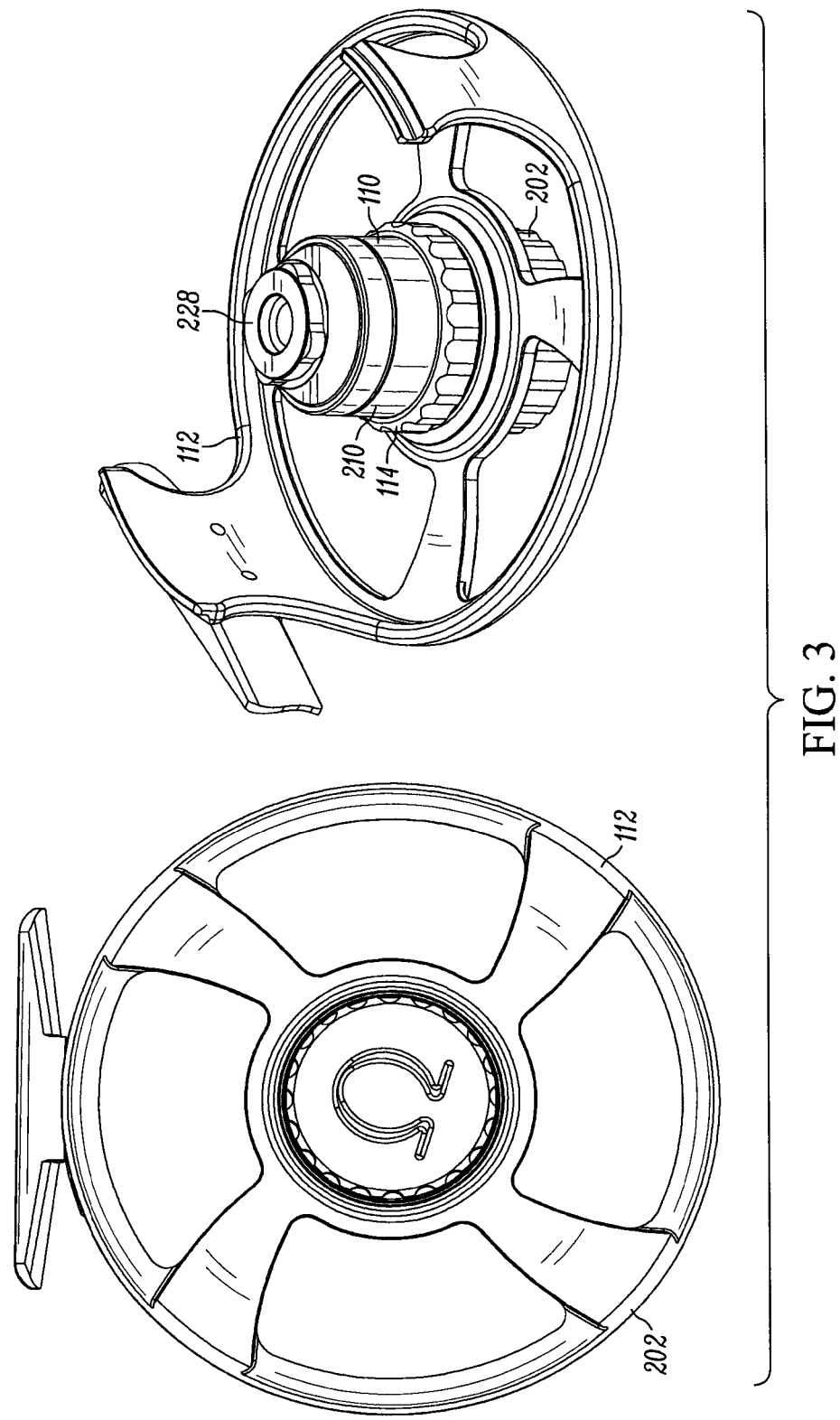
FIG. 3 is an illustration of a frame and drag assembly of one embodiment of the present disclosure.
Figure 4:
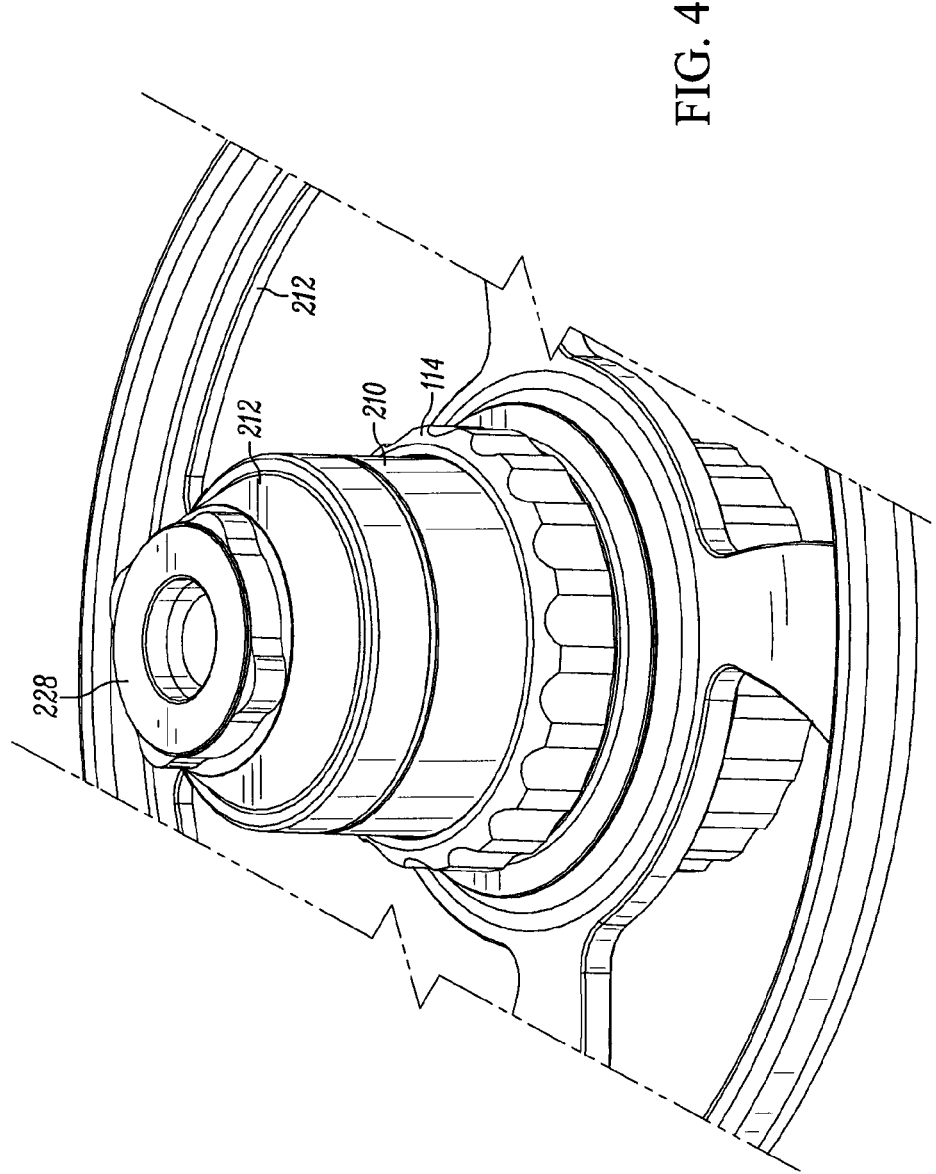
FIG. 4 is a magnified view of the embodiment shown in FIG. 3.

As also shown in FIGS. 2 and 6, base 222 of drag assembly 110 may also include flange 224 and threaded portion 218. Base 222 can be made of any suitable material. In one example, base 222 is machined from aluminum bar stock. In other examples, base 222 can be cast or otherwise constructed from other metals, alloys, and composites. In this example, base 222 also includes flange 224 and threaded portion 218. As can be seen in FIG. 3, when base 222 is inserted into frame 112, drag assembly is seated into frame 112 at flange 224. The outer diameter of flange 112 is larger than the inside of diameter of opening 216 of frame 112 such that drag assembly 110 cannot pass completely through opening 216. Flange 224 may also include one or more anti-rotation features that interact with a pin or other mating feature on frame 112. The anti-rotation feature prevents rotation of drag assembly 110 in frame 112 once drag assembly 110 is seated in frame 112.

As also shown in FIGS. 2 and 6, base 222 may also include threaded portion 218. In this example, the external surface of base 222 that resides near the inside surface of frame 112 when drag assembly 110 is seated in frame 112, may include external threads. As shown in FIGS. 1 and 3, when drag assembly is seated in frame 112, locking mechanism 114 can be placed over drag assembly 110 and used to secure drag assembly 110 to frame 112. To this end, locking mechanism 114, in one example, may be an annular piece of machined aluminum with complimentary threads 220 that are designed to align with the threads on the threaded portion 218 of base 222. As can be appreciated, as the locking mechanism is tightened on threaded portion 218, drag assembly 110 is secured to frame 112 as base 222 is held in position between locking mechanism 114 on the inside surface of frame 112 and flange 224 on the outside surface of frame 112. In this example, locking mechanism 114 is an internally threaded annular member. In other examples, locking mechanism can be constructed in different shapes and materials and can include other locking interfaces such as, but not limited to, retaining washers, push nuts, pins and the like. In still other examples, locking mechanism 114 may not be a separate element but may be integrated into drag assembly 110 and/or frame 112 such as an externally threaded base and an internally threaded opening 216 of frame 112. As shown in FIG. 6, a tool 614 may be used in connection with reel 100. In one example, tool 614 is provided to assist in tightening or loosening locking mechanism 114. Tool 614 can include winged portions to assist a user in this regard. After tool 614 is used, in this example, tool 614 is removed and spool 116 can be connected to drag assembly 110. In other examples, the winged portions or other features of tool 614 may be integrated into locking mechanism 114.

Drag assembly 110, in one example, may include brake housing 210. Brake housing 210 can be made of any suitable material. In one example, brake housing 210 is an aluminum machined component of drag assembly 110. Brake housing 210, as shown in FIG. 6, may include a cylindrical wall 214. Cylindrical wall 214, in this example, defines an inner cavity 602 that is configured to surround and protect the various components of drag system 610. Brake housing 210 connects to base 222 at a lower edge. In one example, the lower edge of brake housing 210 is press fit into base 222. Other methods of attachment may also be used such as complimentary threaded regions on base 222 and brake housing 210 or adhesive, welding, pins, or the like. In this manner, the components of drag system 610 are contained in the cavity defined by cylindrical wall 214 of brake housing 210 and base 222 such that they are shielded from exposure to contaminants.

Brake housing 210 may also include ring 226 at the end of brake housing 210 that connects to nose 212. In one example, ring 226 is an annular protrusion on the top of brake housing 210 that includes a groove in which an o-ring or other sealing member is located such that when nose 212 is connected to brake housing 210, drag assembly 110 is sealed from intrusion by contaminants.

Figure 5:
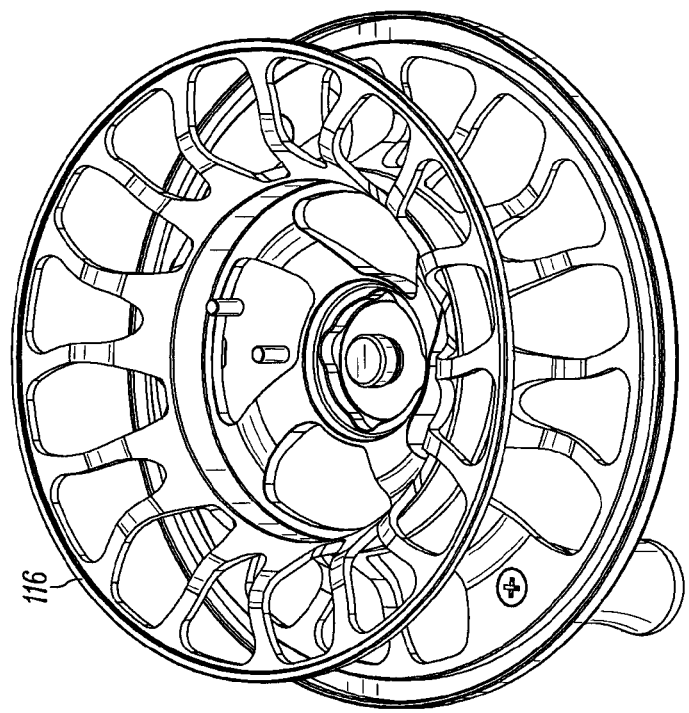
FIG. 5 is an illustration of a spool of present disclosure.
Figure 5:
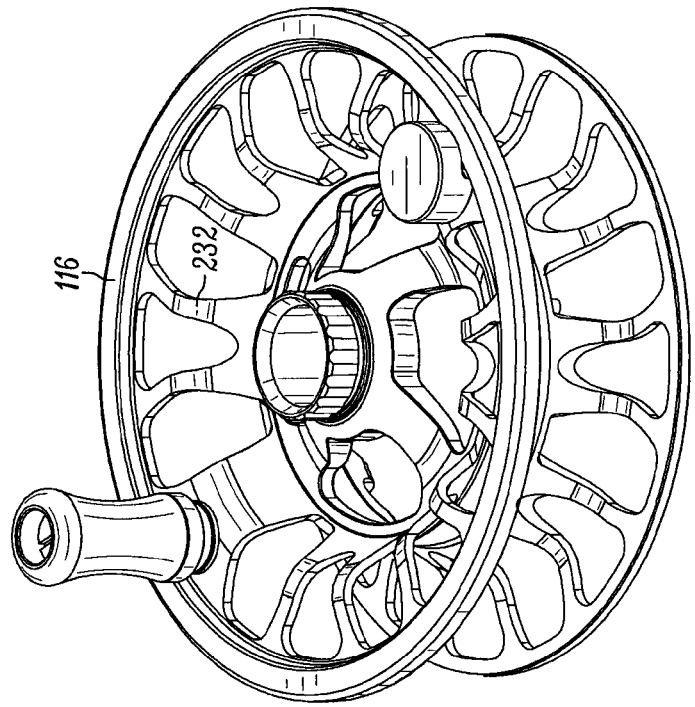

As shown in FIGS. 2 and 6, drag assembly 110 may also include nose 212. In one example, nose 212 includes cog 228, transition portion 230 and shaft 612. Nose 212 can be a single piece of machined aluminum or other suitable material. Nose 212 may also be separate components joined as a single member with suitable attachment methods. Cog 228 is the element of nose 212 that interfaces and attaches to spool 116. In one example, cog 228 is a gear-shaped element with rounded teeth. As shown on FIG. 5, spool 116 has a complimentary female recess positioned at its center. As can be appreciated, the recess in spool 116 engages the cog 228 of nose 212 such that as spool 116 rotates, in order to release or retrieve fishing line, nose 212 rotates as well. In addition to or in place of the gear shape, cog 228 may have other profiles or features to permit spool 116 to engage nose 212 such as bores and pins, keyholes or the like.

At the center of cog 228, in the example shown in FIG. 3 is an internally threaded hole. This hole in nose 212 permits the cap located on the spool 116 to secure the spool in position. Cap 232 extends through a hole in the center of spool 116 and can secure the spool in its operating position.

Nose 212, in one example, may also include shaft 612. Shaft 612 can be a post that extends from a first end of nose 212. The center axis of shaft 612 defines an axis of rotation about which nose 212 rotates during operation of reel 100. Shaft 612, in this example, extends into brake housing 210 and engages drag system 610. As previously discussed, nose 212 is also connected to brake housing 210 at ring 226 and includes a sealing feature to restrict intrusion of contaminants.

Nose 212, in the example shown in FIG. 2, may also include transition portion 230. Transition portion 230 is the portion of nose 212 that is located between brake housing 210 and cog 228. Transition portion may have any suitable profile but in one example, transition portion 230 is frusto-conical in shape and transitions from a first outer diameter similar in size to the outer diameter of the cylindrical wall of brake housing 210 to a smaller second outer diameter at the second end of transition portion 230 adjacent cog 228.

As described above and shown in FIG. 2, drag assembly 110 can be assembled into a single, sealed unit. As a single unit, drag assembly 110 can be removed and installed into frame 112 of reel 100 quickly and easily in order to perform maintenance or repair.

Using one example configuration of reel 100 previously described, a user can quickly and easily remove and replace the drag assembly. One example method of replacement is to remove spool 116 from reel 100 by loosening cap 232 from its engagement in nose 212 of drag assembly 110. With the cap released, spool 116 can be removed. The locking mechanism 114 can then be released from drag assembly 110. In one embodiment, this entails rotating locking mechanism 114 to disengage the complimentary threads between locking mechanism 114 and the threaded portion 218 of base 222. Drag assembly 110 can then be removed from frame 112. A second drag assembly 110 can be replaced into frame 112 and the locking mechanism tightened to seat drag assembly 110 into opening 216 of frame 112. Spool 116 can then be installed onto nose 212 of drag assembly 110 and secured into place with cap 232.

While the particular preferred embodiments have been shown and described, it is obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

The invention claimed is:

1. A fishing reel comprising:
   a frame;
   a drag assembly including a base, a brake housing, and a nose connected together and sealed as a single unit, the drag assembly removably connected to the frame with a locking mechanism, wherein the brake housing includes a cylindrical wall that defines a cavity and wherein the brake housing is located between the base and the nose of the drag assembly, the nose configured to rotate about a central axis and the brake housing is fixed; and
   a spool removably connected to the nose of the drag assembly.

2. A drag assembly for use with a fishing reel, the drag assembly comprising:
   a base;
   a brake housing connected to the base, the brake housing including a cylindrical wall that defines a cavity, the cylindrical wall being configured to be received in a circular opening in a frame of the fishing reel; and
   a nose connected to the brake housing opposite the base;
   wherein the base, the brake housing and the nose are connected together as a single unit that can be secured and removed from the fishing reel with a locking mechanism, and the drag assembly can be secured to the frame with an annular locking mechanism and the base includes a threaded portion that interfaces with complimentary threads on the annular locking mechanism.

3. A drag assembly for use with a fishing reel, the drag assembly comprising:
   a base;
   a brake housing connected to the base; and
   a nose connected to the brake housing opposite the base;
   wherein the base, the brake housing and the nose are connected together as a single unit that can be secured and removed from the fishing reel with a locking mechanism; and further wherein the brake housing is connected between the base and the nose, the nose including a shaft with a central axis about which the nose rotates relative to the base and the brake housing.

4. The drag assembly of claim 3 further comprising an adjustment knob connected to the base, the adjustment knob, the base, the brake housing and the nose connected together as a single unit that can be secured and removed from the fishing reel with the locking mechanism.

5. A drag assembly for use with a fishing reel, the drag assembly comprising:
   a base;
   a brake housing connected to the base; and
   a nose connected to the brake housing opposite the base;
   wherein the base, the brake housing and the nose are connected together as a single unit that can be secured and removed from the fishing reel with a locking mechanism; and further wherein the nose comprises a cog and a frusto-conical transition portion, the transition portion having a first outer diameter substantially the same as an outer diameter of the brake housing at one end and tapering to a second outer diameter smaller than the first outer diameter at the second end, the cog located contiguous the second end of the transition portion and configured to receive a spool of the fishing reel.

* * * * *